United States Patent [19]

Lewis

[11] 3,769,461

[45] Oct. 30, 1973

[54] TIME DIVISION SWITCHING SYSTEM BRIDGING CIRCUIT

[75] Inventor: Theras Gordon Lewis, Boulder, Colo.

[73] Assignee: Bell Telephone Laboratories, Incorporated, Murray Hill, N.J.

[22] Filed: Aug. 3, 1972

[21] Appl. No.: 277,559

[52] U.S. Cl......... 179/15 AT, 179/15 A, 179/15 AQ

[51] Int. Cl.............................................. H04j 3/12

[58] Field of Search..................... 179/15 A, 15 AQ, 179/15 AT, 15 BC

[56] References Cited

UNITED STATES PATENTS

| | | | |
|---|---|---|---|
| 3,251,944 | 5/1966 | Von Sanden | 179/15 AT |
| 3,267,217 | 8/1966 | Schlichte | 179/15 AT |
| 3,433,900 | 3/1969 | Schlichte | 179/15 AT |
| 3,504,123 | 3/1970 | Fischer | 179/15 AT |

*Primary Examiner*—Ralph D. Blakeslee
*Attorney*—W. L. Keefauver et al.

[57] ABSTRACT

In a time division switching system having first and second groups of storage devices, a plurality of first group storage devices are bridged by first detecting the signals on selected first group storage devices in a first plurality of successive time slots in a cycle. The detected signals are summed and stored in a second group storage device during the first plurality of time slots. In each of a second group of successive time slots, a signal is applied to a selected first group storage device for a time corresponding to the difference between the sum signal and twice the selected first group storage device whereby the selected first group storage device receives the signals from all other selected first group storage devices.

12 Claims, 7 Drawing Figures

TIME DIVISION SWITCHING SYSTEM BRIDGING CIRCUIT

BACKGROUND OF THE INVENTION

My invention relates to signal transfer systems, more particularly to time division switching systems employing variable duration active energy transfer arrangements, and more particularly to signal exchange arrangements among a plurality of communication paths in such time division switching systems.

Time division switching systems permit simultaneous exchange of information between selectively connected active terminals over a common communication link. Each information exchange between a pair of terminals occurs in a selected recurring interval or time slot of a repetitive group of time slots. During each scan of the time slot group, pairs of active terminals are connected in sequence to the common link in preassigned sequential time slots. In one time slot a channel is provided between a pair of selected terminals; the information at each terminal assigned to the connection is sampled; and the sampled information is exchanged between the selected terminals over the common link. The common link is available to other connections during the remaining time slots of the scan. As is well known in the art, the sampling rate may be selected to provide an accurate transfer of signals between selectively connected terminals.

In generally known time division switching systems, the time slots are of fixed duration regardless of the quantity of energy exchanged between connected terminals. The time slot duration is selected to allow the transfer of the maximum expected energy. Where speech and other types of audio signals are transferred between active terminals, it is known that the amount of energy transferred in a time slot is variable and that the maximum energy transfer is required only during a very small number of time slots. In a speech connection, for example, a terminal pair may be silent for a considerable portion of the conversation time. Thus, the average amount of speech energy exchanged during the fixed time slot period is much smaller than the maximum energy. Consequently, a time division switching arrangement utilizing constant duration time slots is not used in an efficient manner.

In other division switching systems, the time slot duration is not fixed but varies in accordance with the actual energy exchange and wherein constant current signals are employed to minimize switching losses. Such a time division switching system is disclosed for example in Dimmick, Lewis and O'Neill, U.S. Pat. No. 3,629,839 issued Dec. 21, 1971 and assigned to the same assignee. In this type of time division switching arrangement, there are first and second groups of storage devices. During each time slot, the signal from a selected first group storage device is sampled and transferred to a first common bus and the signal from a selected second group storage device is sampled and transferred to a second common bus. The sampled signals on the buses are applied to a timing circuit which produces a pulse having a duration corresponding to the difference between the sampled signals. In response to the timing circuit pulse, one of first and second polarity constant current signals is applied to the selected first group storage device and the other of said first and second constant polarity signals is applied to the selected second group storage device for the duration of the timing circuit pulse. In this way, the time division switching arrangement operates to exchange signals between a pair of lines coupled to the selected first and second group storage devices. It is often required, however, to exchange signals among three or more lines on a time division basis. Such a conferencing system is disclosed in my copending application Ser. No. 100,308 filed Dec. 21, 1970 (Lewis 3) and assigned to the same assignee. This conferencing arrangement requires the addition of special timing circuits and stores useful only in conference connections. Where it is only necessary to exchange signals among a plurality of first group storage devices, the special conference circuit timing and control arrangements of the aforementioned conferencing arrangement are uneconomical.

BRIEF SUMMARY OF THE INVENTION

My inveniton is a time division communication system wherein a plurality of time slots occurs in repetitive cycles that includes a first common bus to which a plurality of communication path storage devices are selectively connected and a second common bus to which at least a first storage device is selectively connected. Selected communication paths are connected by sampling one selected communication path storage device in each of a first group of time slots on the first common bus and applying a first signal corresponding to the sampled signal to the first storage device via the second common bus. At the end of the first group of time slots, the sum of the selected communication path storage device sampled signals is stored in the first storage device. During each of a second group of time slots, a second signal corresponding to the difference between sum signal in the first storage device signal and twice one selected communication path storage device signal is applied to the one selected communication path storage device whereby each selected communication path receives the signals from all other selected communication paths.

According to one aspect of the invention, each selected communication path storage device is assigned to one of a first group of time slots and is also associated with one of a second group of time slots. In response to the sampled signal from the assigned storage device in the occurring one of said first group of time slots, a first pulse is produced having a duration corresponding to the assigned storage device sample signal. Responsive to the first pulse, a first constant current signal is generated and applied to the first storage device. During each second group time slot, a second pulse is produced corresponding to the difference between the sum signal in the first storage device and twice the signal in the associated storage device. Responsive to the second pulse, a second constant current signal is generated and applied to the associated storage device.

According to another aspect of the invention, the produced first pulse has a duration proportional to the magnitude of the assigned storage device sampled signal. The first constant current signal is of the same polarity as the assigned storage device sample signal and has the same duration as the produced first pulse. The produced second pulse has a duration proportional to the difference between the sum signal in the first storage device and twice the associated device sample signal. The second constant current signal is of the same polarity as said difference and has the same duration as the produced second pulse.

According to yet another aspect of the invention, each communication path storage device is a storage capacitor and the first storage device is also a storage capacitor.

According to yet another aspect of the invention, the first storage capacitor is discharged during the last of the second group of time slots to remove the sum signal therefrom.

In an embodiment illustrative of the invention, a first group of storage capacitors are selectively connectible to a first common bus, a second group of communication path storage capacitors as well as a bridging storage capacitor are selectively connectible to a second common bus. Each selected first group storage capacitor to be bridged is assigned to one of the first plurality of time slots in each repetitive cycle and is also associated with one of a second plurality of time slots in the same repetitive cycle. In each of the first group of time slots, the signal in the assigned first group storage capacitor is sampled and applied to the first common bus. Responsive to the sampled signal on the first common bus, a pulse is produced having a duration corresponding magnitude the magniude of the sampled signal. A constant current signal of the same polarity as the sampled signal and having the same duration as the produced first pulse is applied to the bridging storage capacitor via the second common bus. At the end of the first group of time slots, the sum of the assigned storage capacitor sampled signals is stored in the bridging storage capacitor. In each of the second group of time slots, the sum signal in the bridging storage capacitor is sampled and applied to the second common bus and the signal in the associated storage capacitor is sampled and applied to the first common bus. Responsive to the sampled signals on the first and second common buses, a pulse is produced having a duration proportional to the difference between the sum signal and twice the associated storage capacitor signal. A second constant current signal of the same polarity as said difference and having the same duration as said produced second pulse is then applied to the associated storage capacitor. In this manner each selected storage capacitor receives the sum of the signals on the other selected storage capacitors at the beginning of the repetitive cycle.

DETAILED DESCRIPTION OF THE INVENTION

Figure 1:
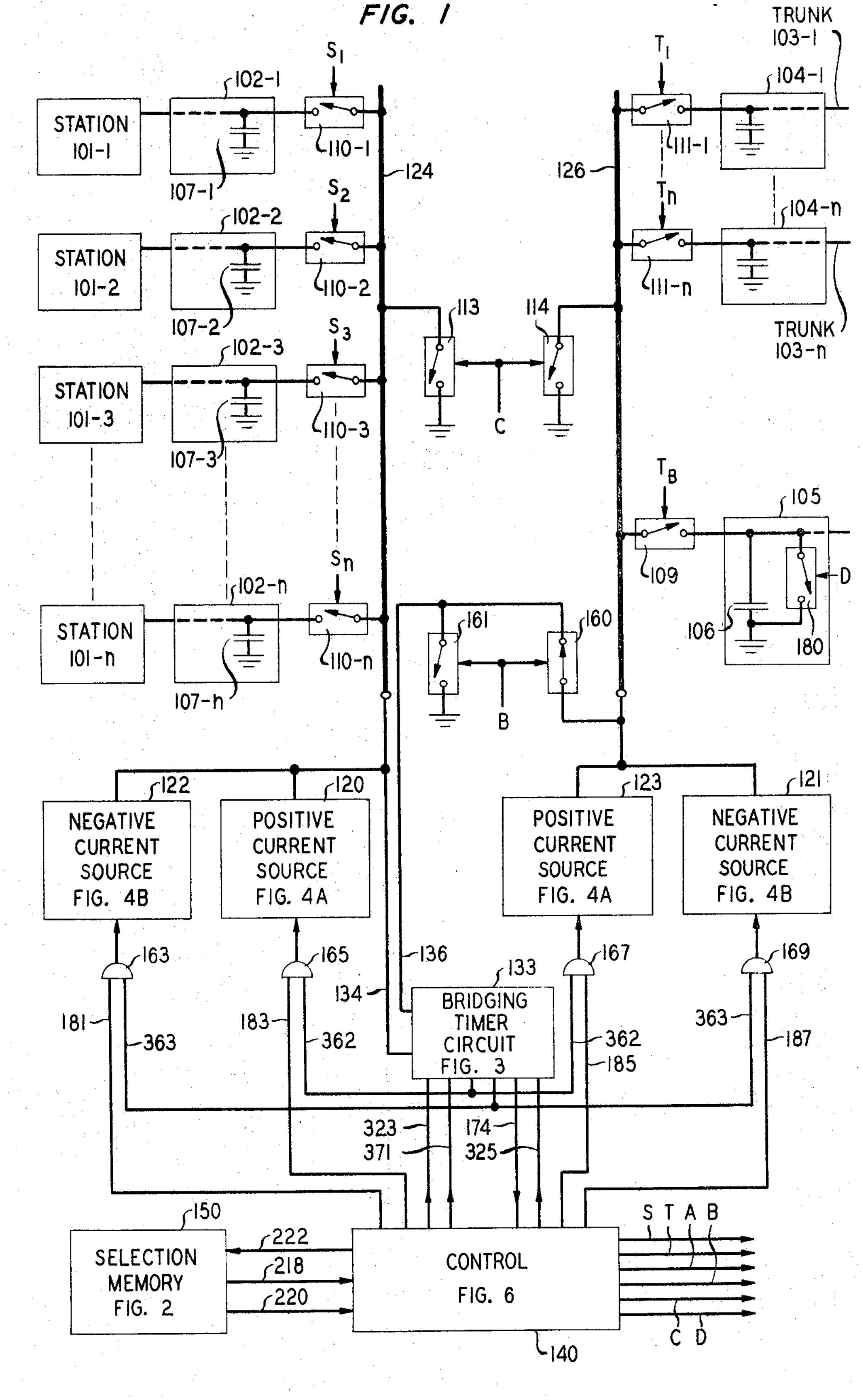
FIG. 1 depicts a block diagram of an embodiment illustrative of my invention.

FIG. 1 shows a block diagram of a time division communication system illustrative of my invention in which a group of stations, 101-1 through 101-n, are coupled to common bus 124 via filter circuits 102-1 through 102-n and time division switches 110-1 through 110-n. Each filter circuit includes a signal storage capacitor. For example, filter circuit 102-1 includes storage capacitor 107-1 and filter circuit 102-n includes storage capacitor 107-n. Trunks 103-1 through 103-n are similarly coupled to common bus 126 via filter circuits 104-1 through 104-n and gates 111-1 through 111-n. A separate bridging storage circuit 105 is coupled to bus 126 via time division switch 109 and includes bridging storage capacitor 106. Buses 124 and 126 are connected to bridging timer circuit 133 via leads 134 and 136, respectively. Positive current source 120 and negative current source 122 are connected to bus 124; and positive current source 123 and negative current source 121 are connected to bus 126. Selection memory 150 shown in greater detail in FIG. 2 operates in conjunction with control 140 to determine which of time division switches 110-1 through 110-n and 111-1 through 111-n and 109 are closed in each time slot. Control 140 shown in detail in FIG. 6 controls the sequence of operations relating to signal exchanges between the storage capacitors selected during each time slot.

Assume for purposes of illustration that a bridging connection is established between stations 101-1, 101-2, 101-3 and 101-n. In this event, a first group of successive time slots is associated with the bridging connection so that the signal contributions of storage capacitors 107-1, 107-2, 107-3 and 107-n may be summed. A second group of successive time slots is associated with the bridging connection so that the summed contributions may be distributed to the bridged communication path storage capacitors. Assume further that the signal voltage on capacitor 107-1 ($V_{71}$) is +1.0 volt, the signal voltage on capacitor 107-2 ($V_{72}$) is +0.5 volts, the signal voltage on capacitor 107-3 ($V_{73}$) is 0.0 volts and the signal voltage on storage capacitor 107-n ($V_{7n}$) is −0.5 volts.

During the first bridging connection time slot in a repetitive cycle, storage capacitor 107-1 is connected to bus 124 via switch 110-1 in response to a signal S1 on cable S from control 140. During this time slot, switch 109 is also closed in response to a signal tB on cable T from control 140 so that the bridging storage capacitor 106 is connected to bus 126. Signal B from control 140 is applied to switches 160 and 161 whereby lead 136 is placed at ground reference potential and bus 126 is disconnected from lead 136.

A sample of the signal from storage capacitor 107-1 is applied to bridging timer circuit 133 via lead 134 and the timer circuit is operative to produce a pulse whose duration corresponds to the signal sample applied thereto. The positive pulse from timer circuit 133 causes positive current source 123 to apply a constant current signal to storage capacitor 106 for the duration of the timer circuit pulse. At the end of the timer circuit pulse, a signal is sent from timer circuit 133 to control 140 via lead 174 which terminates the transfer and enables signal C which is applied to switches 113 and 114. These switches, in response to signal C, quench buses 124 and 126 so that all voltages are removed therefrom. In this way, the signal $V_{71} = +1.0$ volts from capacitor 107-1 is transferred to bridging capacitor 106. In the next three time slots, the signals from capacitors 107-2, 107-3 and 107-n are transferred to capacitor 106 so that at the end of the fourth time slot, capacitor 106 stores a signal corresponding to the sum of the signals ($V_s$) from the bridged communication paths $$V_s = v_{71}+v_{72}+v_{73}+v_{7n} = +1v.$$

In the fifth time slot, switches 110-1 and 109 are both activated. Signal B is removed so that bus 126 is connected to lead 136. Timer circuit 133 is operative in response to the signals from capacitors 107-1 and the sum signal stored in capacitor 106 applied via leads 134 and 136, respectively, to form a pulse whose duration corresponds to the sum signal from capacitor 106 less twice the signal on capacitor 107-1 ($v_s-2v_1$). During this time slot, one of positive current source 120 and negative current source 122 is activated whereby a constant current signal is applied to capacitor 107-1 corresponding to the output pulse from timer circuit 133. The current source having the same polarity as the difference signal is selected. As a result of the constant current charge of capacitor 107-1, the sum signal voltage less twice the sample signal voltage from capacitor 107-1 is applied to capacitor 107-1 whereby the signal in capacitor 107-1 at the end of the current transfer is the sum of the signal samples from capacitors 107-2, 107-3 and 107-n. During the next time slot, a similar transfer is accomplished whereby the sum of all other bridged communication path signals at the beginning of the repetitive cycle is stored in capacitor 107-2. During the last of the second group of time slots, the bridging connection is completed for a repetitive cycle and bridging capacitor 106 is discharged so that it is available for another bridging connection in the same repetitive cycle or for the same bridging connection in the succeeding repetitive cycle.

Figure 2:
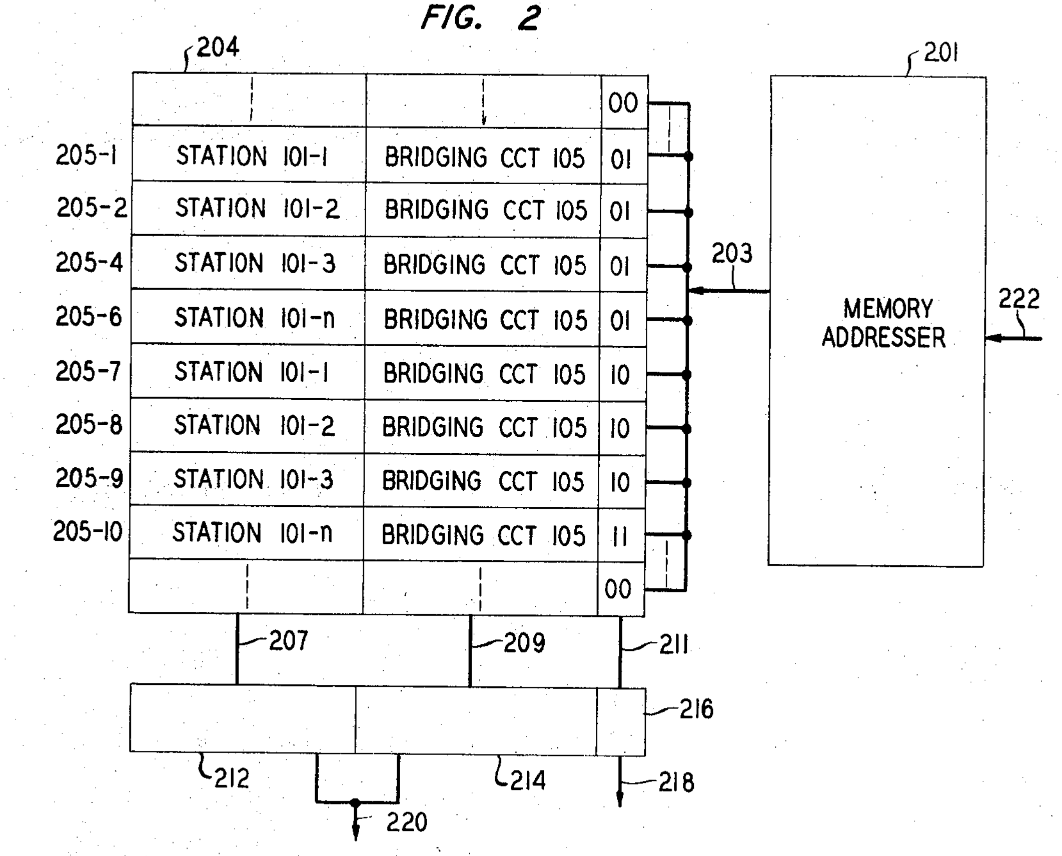
FIG. 2 shows a block diagram of selection memory useful in the embodiment of FIG. 1.
Figure 6:
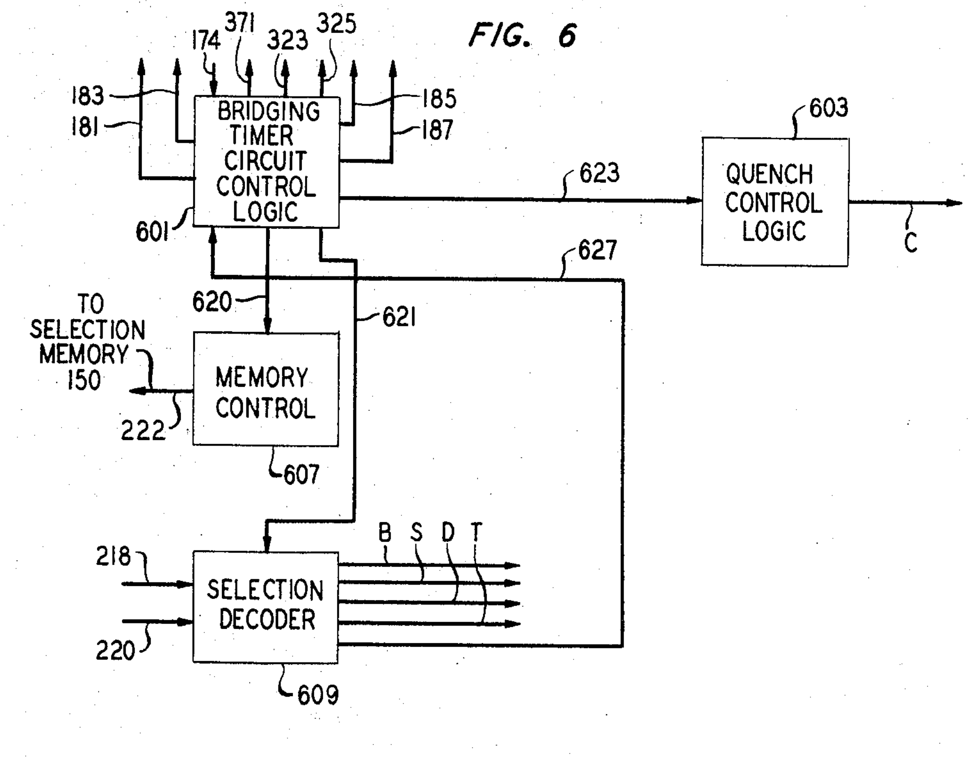
FIG. 6 shows a block diagram of control arrangements useful in the embodiment of FIG. 1.
Figure 5:
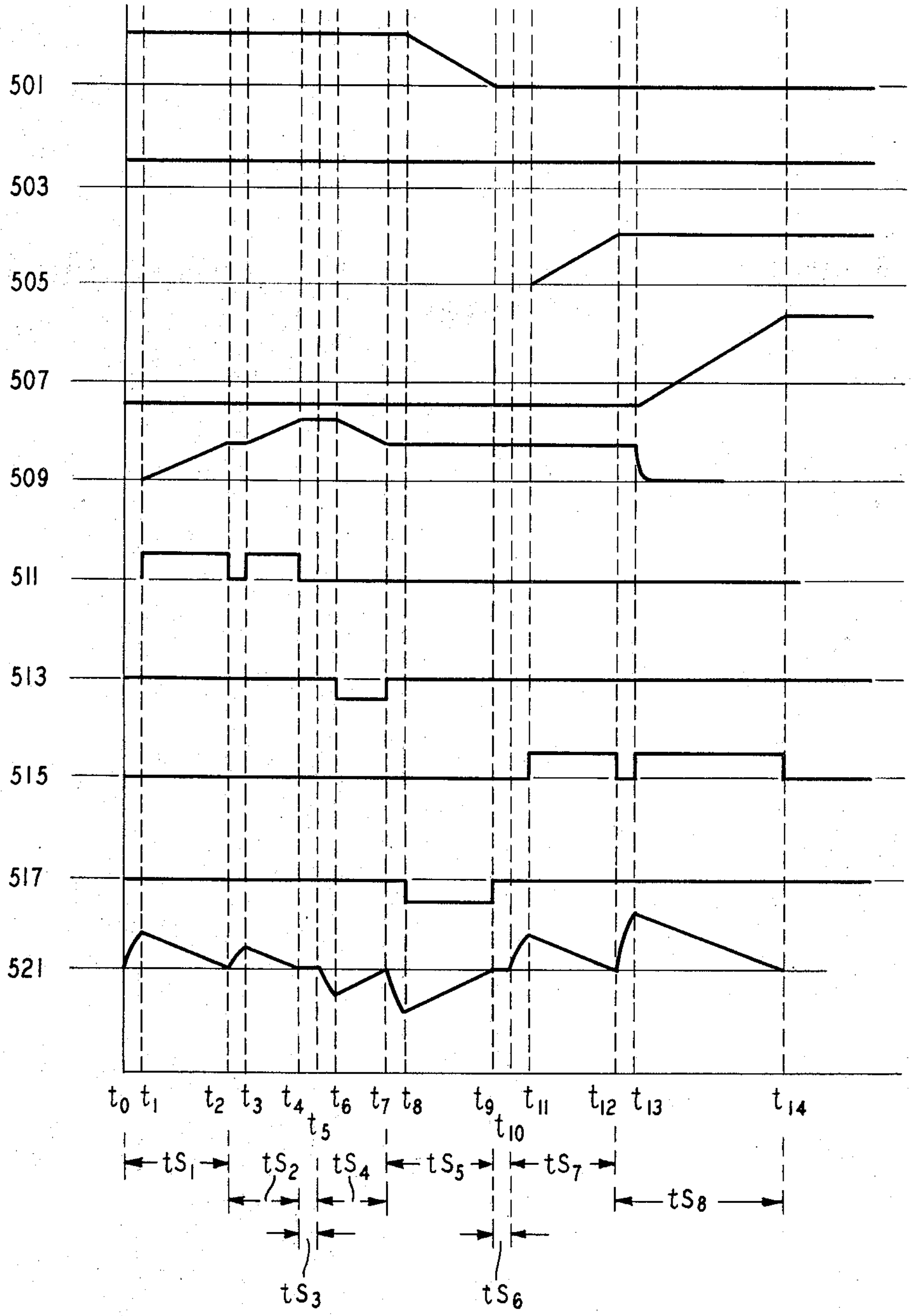
FIG. 5 shows waveforms useful in describing the operation of the embodiment of FIG. 1.

At the beginning of the first bridging time slot of each repetitive cycle, a signal is sent from timer circuit control logic circuit 601, FIG. 6, to memory addresser 201 of FIG. 2 via memory control 607 and lead 222. In response to signals from memory addresser 201 via cable 203, memory 204 is operative to transfer the contents of memory cell 205-1 to registers 212, 214 and 216. The first portion of memory cell 205-1 contains a code corresponding to the address of station 101-1. The second portion of memory cell 205-1 contains a code addressing bridge circuit 105 and the third portion of memory cell 205-1 contains a two-bit code indicating that the cell is involved in a bridging connection. The code is a 01 signifying that the cell contains information to be accumulated in the bridging communication path storage device signal during the first group of time slots. The code for station 101-1 is transferred to register 212. The code for bridging circuit 105 is transferred to register 214, and the status indicating code is transferred to register 216. The contents of register 212 and 214 are transmitted via cable 220 to selection decoder 609 of FIG. 6. Responsive to these codes, selection decoder 609 applies a signal S1 to cable S and a signal TB to cable T. These signals are applied to time division switches 110-1 and 109, respectively, whereby storage capacitor 107-1 is connected to bus 124 and storage capacitor 106 is connected to bus 126. The bridging status code from register 216 is applied to selection decoder 609 via lead 218. Responsive to the status code, signal B is applied to switches 160 and 161 whereby bus 126 is disconnected from lead 136 and lead 136 is connected to a ground reference potential. These operations occur between times t0 and t1 of time slot ts1 in FIG. 5.

Figure 3:
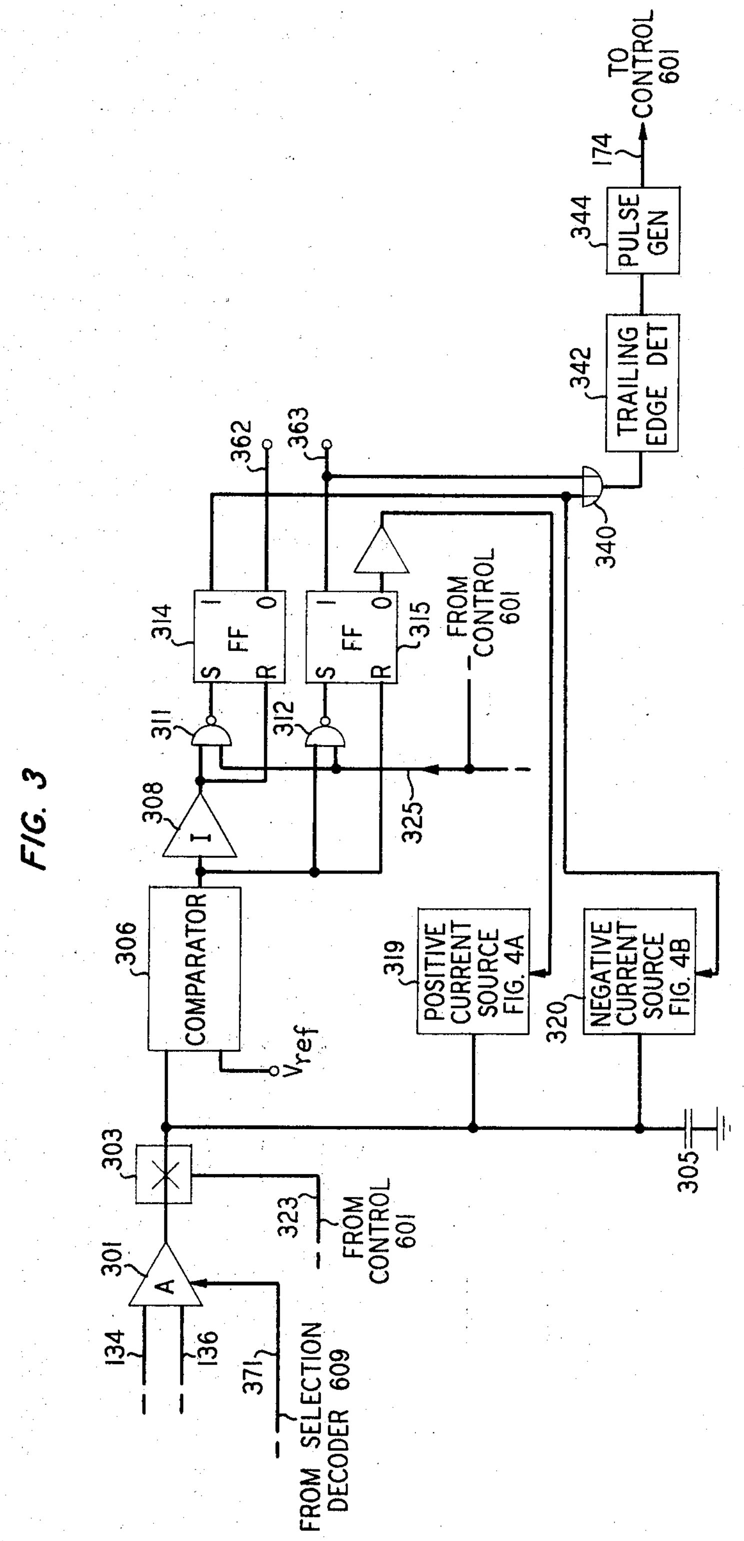
FIG. 3 shows a block diagram of a bridging timer circuit useful in the embodiment of FIG. 1.

Between times t0 and t1, a signal is applied from control logic 601 to switch 303 in the timer circuit of FIG. 3 via lead 323. Switch 303 is closed whereby the output of amplifier 301 is connected to capacitor 305. The signal on lead 134 which is the signal sample from storage capacitor 107-1 shown in waveform 501 is thereby applied to capacitor 305 wherein it is stored by time t1 as indicated in waveform 521. Since capacitor 107-1 contained a +1.0 volt signal, capacitor 305 is charged to +1.0 volts at time t1.

The voltage on capacitor 305 is applied to comparator 306 wherein it is compared to reference voltage $V_{ref}$. The positive voltage on capacitor 305 at time t1 causes the output of comparator 306 to assume a low logic level. This low logic level is applied to inverter 308 and to one input of NAND gate 312. The output of inverter 308 at time t1 is a high logic level which is applied to NAND gate 311. At time t1, a high logic level signal is applied from control logic 601 via lead 325 to gates 311 and 312. This high logic level in combination with the high logic level from inverter 308 causes gate 311 to be opened whereby a low logic level is applied to the set input of flip-flop 314. Gates 311 and 312 are NAND gates well known in the art each of which provides a low level output when all inputs thereto are high.

The low output of gate 311 at time t1 causes flip-flop 314 to be set whereby the 1 output thereof is a high level and the 0 output thereof is a low level. The low logic level output on lead 362 from flip-flop 314 is applied to one input of AND gate 167. In response to the bridging status code in register 216 at this time, a low level signal is applied from control 601 to gate 167 via lead 185. Consequently, the output of gate 167 causes positive current source 123 to provide a positive constant current signal to bridging storage capacitor 106 via bus 126 and now closed switch 109 as indicated in waveform 511. In this way, bridging storage capacitor 106 is charged to a positive signal voltage.

The high output from flip-flop 314 is also applied to negative constant current source 320 at time t1. The current from source 320 causes capacitor 305 to discharge at a constant rate as indicated on waveform 521. When the voltage on capacitor 305 is equal to the reference voltage $V_{ref}$ applied to the other input of comparator 306, the output of comparator 306 reverts to a high logic level and the output of inverter 308 reverts to a low level. This low level causes flip-flop 314 to reset whereby positive current source 123 is turned off. Negative current source 320 is also turned off. This occurs at time t2 when capacitor 305 has been discharged to $V_{ref}$ as indicated in waveform 521. The charging of bridging storage capacitor 106 occurs at a constant rate between times t1 and t2 and the voltage appearing on capacitor 106 is shown on waveform 509 in FIG. 5. In this way, the +1.0 volt signal originally in capacitor 107-1 is transferred to bridging storage capacitor 106. At time t2, the transfer is completed and a negative going signal is sent from the 1 output of flip-flop 314 to trailing edge detector 342 via OR gate 340. Responsive to the negative going signal, pulse generator 344 produces an output pulse which is transmitted to control logic 601 via lead 174. This signal causes quench control logic 603 to produce signal C. Signal C closes both switches 113 and 114 to quench common buses 124 and 126. The signal on lead 174 also initiates the next time slot, time slot ts2, via control logic 601.

At time t2, memory addresser 201 causes the contents of memory cell 205-2 to be inserted in registers 212, 214 and 216 responsive to a signal from memory control 607 via lead 222. The code in register 212 addresses station 101-2. The code in register 214 addresses the bridging circuit 105. The 01 code in register 216 indicates that the present time slot is used to transfer information from station 101-2 to bridging storage capacitor 106 so that signal B is required. Signals from registers 212, 214 and 216 are applied to selection decoder 609 wherefrom signals are transmitted to time division switches 110-2 and 109. The 01 status code signal B to be applied to switches 160 and 161 as in time slot ts1.

Switches 110-2 and 109 are now closed, and the +0.5 volt signal from storage capacitor 107-2 shown in waveform 503 is applied to amplifier 301 in FIG. 3 via switch 110-2, common bus 124 and lead 134. Switch 303 is closed in response to control signal 323 between times t2 and t3 so that capacitor 305 is charged to +0.5 volts as indicated in waveform 521 in FIG. 5. In response to the voltage on capacitor 305, the output of comparator 306 is low at time t3; and as aforementioned with respect to time slot ts1, the low output of comparator 306 causes flip-flop 314 to be set which, in turn, turns on positive current source 123 as indicated in waveform 511 and negative current source 320 at time t3. A positive constant current signal is applied to bridging storage capacitor 106 from source 123 whereby capacitor 106 is charged positively at a constant rate as indicated in waveform 509. The negative constant current applied to capacitor 305 discharges this capacitor linearly as indicated in waveform 521. At time t4, the voltage on capacitor 305 is equal to the reference voltage $V_{ref}$ applied to the comparator and comparator 306 reverts to a high level. The output of inverter 308 becomes low so that flip-flop 314 is reset and current sources 123 and 320 are turned off. A negative going signal is transmitted to trailing edge detector 322 from the output of flip-flop 314. Pulse generator 344 is turned on so that a quenching signal C is generated in control logic 603 and common buses 124 and 126 are discharged responsive to the closure of switches 113 and 114. The voltage on bridging storage capacitor 106 (waveform 509) at this time is +1.5 volts which is the sum of the voltages on capacitors 107-1 and 107-2.

The next time slot ts3 is initiated at time t4. At this time, the contents of memory cell 205-4 are placed in registers 212, 214 and 216 and selection decoder 609 is operative to produce signals S3 and tB. Switches 110-3 and 109 are closed and a ground reference voltage is applied to lead 136. Since the signal on capacitor 107-3 is 0.0 volts (waveform 505), capacitor 305 is not charged whereby substantially no current is applied to capacitor 106 and the time slot is terminated at t5.

At the beginning of time slot ts4, the contents of memory cell 205-6 are transferred to registers 212, 214 and 216, and switches 110-n and 109 are closed responsive to the operation of selection decoder 609. The signal from storage capacitor 107-n (waveform 507) is applied to amplifier 301 since switch 303 is closed in response to the control signal on lead 323. Capacitor 305 is charged to −0.5 volts as indicated in waveform 521 between times t5 and t6. At time t6, the output of comparator 306 is high responsive to the negative signal on capacitor 305 and the output of inverter 308 is low.

A high level control signal is applied from control logic 601 to gates 311 and 312 via lead 325. Since both inputs to NAND gate 312 are high at this time, the output of gate 312 is low whereby flip-flop 315 is set. A high level occurs at the 1 output of flip-flop 315 at t6 and this high level is applied to gate 169 via lead 363. The other input to gate 169 from control 601 via lead 187 is also high so that gate 169 is opened and negative current source 121 is turned on as indicated in waveform 513. A negative constant current is then applied to bridging storage capacitor 106 via bus 126 and now closed switch 109. This is shown in waveform 509 between times t6 and t7. Since flip-flop 315 is set at time t6, the low level from the 0 output of flip-flop 315 causes positive current source 319 to turn on whereby capacitor 305 is charged positively as indicated in waveform 521 between times t6 and t7. At t7, the voltage on capacitor 305 is equal to the reference voltage $V_{ref}$ on the other input to comparator 306 whereby the output of comparator 306 becomes low. This low level is applied to the R input of flip-flop 315 so that flip-flop 315 is reset and current sources 121 and 319 are turned off. A negative going signal is applied to trailing edge detector 342 from the 1 output of flip-flop 315 via OR gate 340 and responsive thereto pulse generator 344 applies a signal on lead 174 to control logic 601. Quench control logic 603 is activated and buses 124 and 126 are quenched via switches 113 and 114. At time t7, the sum of the voltages from all bridged storage capacitors ($v_s = +1.0v$) is stored on bridging storage capacitor 106 as shown in waveform 509.

During the next time slot ts5 initiated by pulse on lead 174 at t7, the contents of memory cell 205-7 are transferred to registers 212, 214 and 216 so that signals S1 and tB close time division switches 110-1 and 109. The status code is now 10 indicating that the difference between the sum signal voltage on storage capacitor 106 and twice the signal voltage on capacitor 107-1 is to be applied to timer circuit 133. The 10 status code causes a control signal to be applied to amplifier 301 via lead 371 so that the amplifier is operative to subtract twice the signal voltage on lead 134 from the signal voltage on lead 136. Between times t7 and t8, switch 303 is closed so that this difference voltage is placed on capacitor 305 by time t8 as indicated in waveform 521. The difference voltage at this time is $$v_s - 2v_{71} = -1.0v.$$

This negative voltage causes the output of comparator 306 to be a high level whereby flip-flop 315 is set as previously described. A high level signal from the 1 output of flip-flop 315 is then applied to gate 163 via lead 363. In response to the 10 status code, a high logic level is applied to the other input of gate 163 via lead 181. Gate 163 is opened at time t8 and negative current source 122 applies a constant negative current to storage capacitor 107-1 via bus 124 and now closed switch 110-1 as indicated in waveform 517. Capacitor 107-1 is linearly discharged by the current from source 122 as indicated in waveform 501. Positive current source 319 is also operative at t8. The voltage on capacitor 305 is increased linearly as shown in waveform 521 between times t8 and t9. At time t9, the voltage on capacitor 305 is equal to the reference voltage $V_{ref}$ applied to comparator 306 and flip-flop 315 is reset by the low output of inverter 308. Current sources 319 and 122 are turned off responsive to the resetting of flip-flop 315 and a pulse is applied to control logic 601 via lead 174 so that buses 124 and 126 are quenched in response to signal C. At time t9, the end of time slot ts5, the voltage on capacitor 107-1 is zero volts which is the sum of the voltages on capacitors 107-2, 107-3 and 107-n at the beginning of the present repetitive cycle.

In time slot ts6, between times t9 and t10, the contents of memory cell 205-8 are addressed so that signals S2 and tB are applied to switches 110-2 and 109 from selection decoder 609. The signal in storage capacitor 107-2 is applied to amplifier 301 via bus 124 and lead 134 and the signal from bridging storage capacitor 106 is applied to amplifier 301 via bus 126 and lead 136. Amplifier 301 is conditioned by the signal on lead 371 to subtract twice the signal voltage in capacitor 107-2 from the sum voltage in capacitor 106. Since the sum voltage is 1.0 volts and the signal voltage in capacitor 107-2 is +0.5 volts, the output signal voltage of amplifier 301 at time t10 is 0.0 volts. Thus, no voltage is applied to capacitor 305 through switch 303. The time slot is terminated substantially at time t10 since the voltage on capacitor 305 is almost immediately equal to the reference voltage applied to comparator 306. The signal voltage on capacitor 107-2 at time t10 remains at +0.5 volts (waveform 503) which is the sum of the signal voltages on capacitors 107-1, 107-3 and 107-n at the beginning of the bridging connection in the present repetitive cycle.

The next time slot, ts7, is initiated at time t10. Between times t10 and t11, the contents of memory cell 205-9 is read out into selection decoder 609 so that signals S3 and tB are applied to switches 110-3 and 109. These switches are closed and the signal voltage in capacitor 107-3 (0.0 volts on waveform 505) is applied to amplifier 301 via bus 124 and lead 134. The sum voltage from capacitor 106 (+1.0 volts) is again applied to amplifier 301 via bus 126 and lead 136. The output of amplifier 301, responsive to the status code of 10 in cell 205-9 is the sum voltage from capacitor 106 less twice the signal voltage on capacitor 107-3. The output of amplifier 301 is applied to capacitor 305 via switch 303 which is closed responsive to the signal on lead 323. Capacitor 305 is charged to +1.0 volts by time t11 as indicated on waveform 521.

At time t11, the output of comparator 306 is low responsive to the difference between the signal voltage on capacitor 305 and the reference voltage $V_{ref}$ applied to the comparator. As previously described, NAND gate 311 is opened at time t11 responsive to the high outputs on inverter 308 and on lead 325 whereby flip-flop 314 is set. The low signal from the 0 output of flip-flop 314 is applied to one input of gate 165 via lead 362. Another low input is applied to gate 165 from control 601 via lead 183 whereby positive current source 120 is turned on as indicated in waveform 515 and storage capacitor 107-3 is charged at a constant rate as shown in waveform 505. Negative current source 320 is also turned on by the high signal from the 1 output of flip-flop 314 whereby capacitor 305 is linearly discharged as shown in waveform 521 between times t11 and t12.

At time t12, the voltage on capacitor 305 is equal to the reference voltage $V_{ref}$ applied to comparator 306 whereby the output of comparator 306 becomes high and flip-flop 314 is reset. Current sources 120 and 320 are turned off at time t12 and the voltage on storage capacitor 107-3 is +1.0 volts as indicated in waveform 505. This voltage is equal to the sum of the voltages in capacitors 107-1, 107-2 and 107-n at the beginning of the bridging connection in the present repetitive cycle. The negative transition at the 1 output of flip-flop 314 at time t12 causes trailing edge detector 342 to operate which in turn provides a pulse on lead 174 through pulse generator 344. This pulse is returned to control logic 601. Control logic 601 causes quench control logic 603 to generate signal C. Signal C is applied to switches 113 and 114 which switches close and cause buses 124 and 126 to be quenched.

Time slot ts8 is initiated in response to the pulse on lead 174 at time t12. Between times t12 and t13, the contents of memory cell 205-10 are read out into registers 212, 214 and 216 and selection decoder 609 provides signals Sn and tB to close switches 110-n and 109. The status code in register 218 is now 11 which signifies the last time slot of the bridging connection. This code causes selection decoder 609 to generate a signal D at time t13. Between times t12 and t13, the signal voltage in storage capacitor 107-n is applied to amplifier 301 via bus 124 and lead 134 and the sum voltage in bridging storage capacitor 106 is applied to amplifier 301 via bus 126 and lead 136. Since a signal is applied to amplifier 301 via lead 371 responsive to the 11 status code, the output of amplifier 301 in this time interval is the difference between the sum voltage from capacitor 106 and twice the signal voltage on capacitor 107-n. Thus capacitor 305 is charged to +2.0 volts through switch 303 by time t13 as indicated in waveform 521. At time t13, the signal D from selection decoder 609 closes switch 180 in bridging circuit 105 whereby bridging storage capacitor 106 is discharged as indicated in waveform 509.

Since the voltage on capacitor 305 at time t13 is +2.0 volts, the output of comparator 306 becomes low. Gate 311 is opened in response to the high output of inverter 308 and the high control signal on lead 325 whereby flip-flop 314 is set. The 0 output of flip-flop 314 is low and this low signal is applied to AND gate 165 via load 362. The signal on lead 183 from control logic 601 is also low at this time. Gate 165 is opened and positive current source 120 is turned on as indicated on waveform 515. The high signal from the 1 output of flip-flop 314 turns on negative current source 320 so that capacitor 305 is linearly discharged between times t13 and t14. This is shown on waveform 521. At time t14, the voltage on capacitor 305 is equal to the reference voltage $V_{ref}$ applied to comparator 306. The output of comparator 306 becomes high, the output of inverter 308 is low and flip-flop 314 is reset. Current sources 120 and 320 are turned off, and the resulting voltage on storage capacitor 107-n is +1.5 volts as indicated on waveform 507. This signal voltage on capacitor 107-n is the sum of the signal voltages on capacitors 107-1, 107-2 and 107-3 at the start of the bridging connection during the present repetitive cycle as desired. The negative transition of the 1 output of flip-flop 314 at time t14 causes trailing edge detector 342 to turn on pulse generator 344; and the output of pulse generator 344 is applied to control logic 601. Time slot ts8 is then terminated and the bridging operation is completed.

Figure 4A:
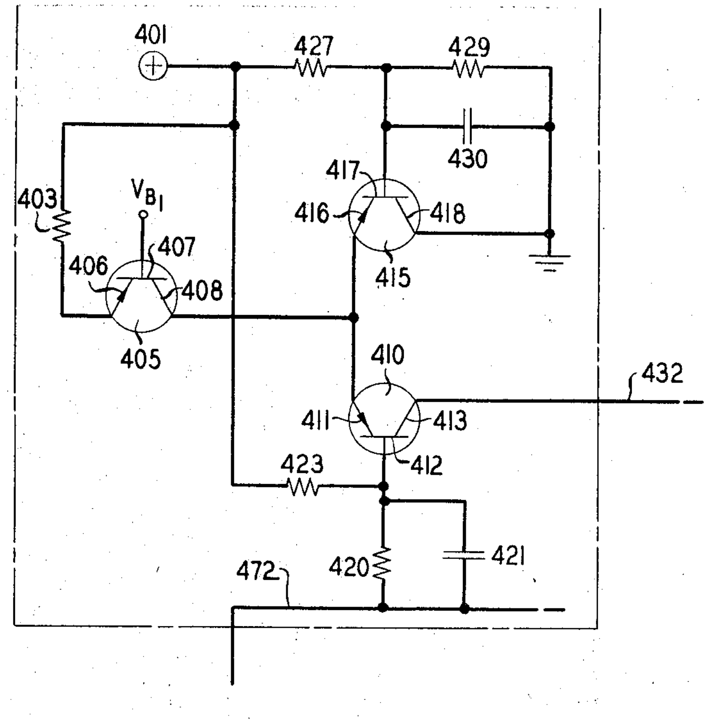
FIGS. 4A and 4B show schematic diagrams of current source circuits useful in the embodiment of FIG. 1.

The circuit shown in FIG. 4A may be used in the positive current sources of FIG. 1 and 3 to provide positive constant current. it is to be understood that other constant current circuit arrangements known in the art may also be used. Referring to FIG. 4A, emitter 406 of transistor 405 received a predetermined current from the source including voltage source 401 and resistor 403. Base 407 is biased at voltage $V_{B1}$ so that transistor 405 is conducting with its collector-base diode reverse biased. In this mode of operation, transistor 405 provides a constant current which normally flows into emitter 416 of transistor 415 since transistor 416 is normally turned on by means of the divider network connected to base 417. This divider network comprises resistors 427 and 429 which resistors are arranged so that the emitter-base diode of transistor 415 is forward biased. Capacitor 430 provides a bypass path to filter noise appearing on base 417.

Lead 472 is connected to a logic signal source so that a negative going input signal may be applied to base 412 of transistor 410 via the coupling network including resistor 420, capacitor 421, and resistor 423. This network is arranged to normally reverse bias base 412 in the absence of a negative going signal on lead 472. When a negative going signal is applied to lead 472, transistor 412 conducts and the constant current from collector 408 is applied to lead 432 via the emitter-collector path of transistor 410. When transistor 410 conducts, emitter 416 of transistor 415 is reverse biased and the current from transistor 405 is then applied to lead 432. This arrangement permits a positive constant current from a high impedance source to be generated.

Figure 4B:
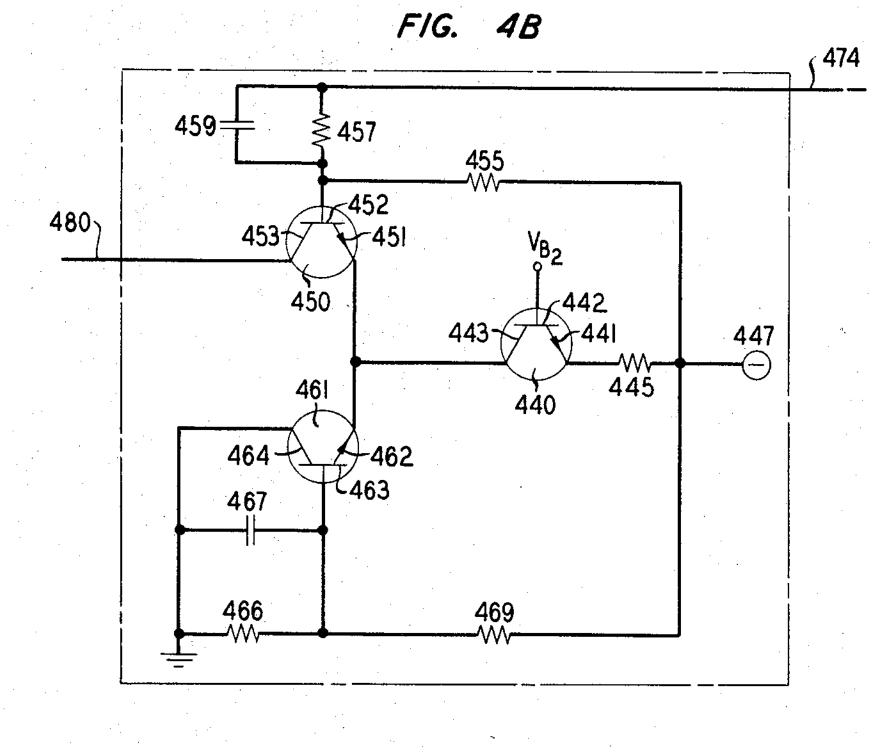

A negative constant current source that may be used in FIGS. 1 and 3 is shown in FIG. 4B. The arrangement therein comprises transistors 461, 450 and 440. Negative voltage source 447 and resistor 445 provides a negative current for emitter 441 of transistor 440. The bias voltage $V_{B2}$ on base 442 causes transistor 440 to conduct with the collector-base diode thereof reverse biased. This provides a constant current to normally conducting transistor 461. The base network arrangement including negative source 447, resistors 469 and 466, and capacitor 467 forward biases the base emitter diode of transistor 461 so that this transistor conducts. This leaves transistor 450 in a nonconducting state. When a positive going pulse is applied to lead 474 from timer circuit 133, base 452 is made positive through the network including resistors 457 and 455 and capacitor 459. The base-emitter diode of transistor 450 then conducts and the current from collector 443 is applied through the emitter-collector path of transistor 450 to lead 480. With transistor 450 conducting, transistor 461 is cut off. In this way a negative constant current source is provided. Current sources 120, 121, 122 and 123 are arranged to provide equal magnitude currents whereby the amount of charge transferred to the storage capacitors associated with buses 124 and 126 are controlled.

What is claimed is:

1. In a time division communication system having a plurality of communication path storage devices wherein a plurality of time slots occurs in repetitive cycles, a circuit for exchanging signals among two or more selected communication path storage devices comprising a first common bus, a second common bus, means for defining a first group of time slots in each repetitive cycle, means for assigning one selected communication path storage device to each first group time slot, means for associating one selected communication path storage device with each second group time slot, a first storage device selectively connectible to said second common bus, apparatus operative in each of said first group of time slots comprising means for sampling the signal in the storage device assigned to the occuring first group time slot and for applying said sample signal to said first common bus, means responsive to said sampled signal on said first common bus for generating and applying a first signal corresponding to said assigned storage device sampled signal to said first storage device via said second bus whereby said first storage device stores the sum of the assigned storage device sampled signals at the end of said first group of time slots, apparatus operative in each of said second group of time slots comprising means for sampling the signal in the storage device associated with the occurring second group time slot and for applying said associated storage device sampled signal to said first common bus, means for sampling the sum signal in said first storage device and for applying said sampled sum signal to said second common bus, and means connected to said first and second common buses for generating and applying a second signal corresponding to the difference between the sampled sum signal and twice the associated storage device sampled signal to said associated storage device whereby each associated storage device receives the sum of the sampled signals from the other associated storage devices.

2. In a time division communication system having a plurality of communication path storage devices wherein a plurality of time slots occurs in repetitive cycles, a circuit according to claim 1 further comprising means operative during the last time slot of said second group of time slots for removing the stored sum signal from said first storage device.

3. In a time division communication system having a plurality of communication path storage devices wherein a plurality of time slots occurs in repetitive cycles, a circuit according to claim 2 wherein said first signal generating and applying means comprises means for producing a first pulse having a duration corresponding to said assigned storage device sampled signal, and means responsive to said produced first pulse for generating and applying a first constant current signal to said first storage device via said second common bus, and said second signal generating and applying means comprises means for producing a second pulse having a duration corresponding to the difference between said sampled sum signal and twice said associated storage device sampled signal, and means responsive to said produced second pulse for generating and applying a second constant current signal to said associated storage device.

4. In a time division communication system having a plurality of communication path storage devices wherein a plurality of time slots occurs in repetitive cycles, a circuit according to claim 3 wherein said first pulse producing means comprises means for producing a pulse having a duration proportional to the magnitude of said first signal, said first constant current generating means comprises means for generating a constant current signal of the same polarity as said assigned storage device sampled signal and having the same duration as said produced first pulse; and said second pulse producing means comprises means for producing a pulse having a duration proportional to the magnitude of the difference between said sampled sum signal and twice said associated storage device sampled signal, and said second constant current generating and applying means comprises means for generating a constant current signal of the same polarity as said difference signal and having the same duration as said produced second pulse.

5. In a time division communication system having a plurality of communication path storage devices wherein a plurality of time slots occurs in repetitive cycles, a circuit according to claim 4 wherein each of said communication path storage devices comprises a storage capacitor and said first storage device comprises a first storage capacitor.

6. In a time division communication system having a plurality of communication path storage devices wherein a plurality of time slots occurs in repetitive cycles, a circuit according to claim 5 wherein said stored sum signal removing means comprises means operative during the last time slot of said second group of time slots for discharging said first storage capacitor.

7. In a time division communication system having first and second groups of communication path storage devices wherein a plurality of time slots occurs in repetitive cycles, a circuit for bridging two or more selected first group communication path storage devices in each repetitive cycle comprising a first common bus, a second common bus, means for defining a first plurality of time slots and a second plurality of time slots in each repetitive cycle, means for assigning a selected first group communication path storage device to each of the first plurality of time slots, means for associating one selected first group communication path storage device with each of the second plurality of time slots in each repetitive cycle, a bridging storage device selectively connectible to said second common bus, apparatus operative in each of said first plurality of time slots comprising means for sampling the signal in the storage device assigned to the occuring one of said first plurality of time slots and for applying said assigned storage device sample signal to said first common bus, means responsive to said assigned storage device sampled signal on said first common bus for generating and applying a first signal corresponding to said assigned storage device sampled signal to said bridging storage device via said second bus whereby said bridging storage device stores the sum of the selected storage device sampled signals at the end of said first plurality of time slots, apparatus operative in each of said second plurality of time slots comprising means for sampling the signal in the storage device associated with the occurring one of said second plurality of time slots and for applying said associated storage device sampled signal to said first common bus, means for sampling the sum signal in said bridging storage device and for applying said sampled sum signal to said second common bus, means connected to said first and second common buses for generating and applying a second signal corresponding to the difference between the sampled sum signal and twice the associated storage device sampled signal to said associated storage device whereby each associated storage device receives the sum of the sampled signals from the other associated storage devices.

8. In a time division communication system having first and second groups of communication path storage devices wherein a plurality of time slots occurs in repetitive cycles, a circuit according to claim 7 further comprising means operative in the last time slot of said second plurality of time slots for removing the stored sum signal from said bridging storage device.

9. In a time division communication system having first and second groups of communication path storage devices wherein a plurality of time slots occurs in repetitive cycles, a circuit according to claim 8 wherein said first signal generating and applying means comprises means for producing a first pulse having a duration corresponding to said assigned storage device sampled signal, means responsive to said produced first pulse for generating and applying a first constant current signal of the same polarity as said assigned storage device sampled signal to said bridging storage device via said second common bus, and said second signal generating and applying means comprises means for producing a second pulse having a duration corresponding to the difference between said sampled sum signal and twice said associated storage device sampled signal, and means responsive to said produced second pulse for generating and applying a second constant current signal of the same polarity as said difference to said associated storage device.

10. In a time division communication system having first and second groups of communication path storage devices wherein a plurality of time slots occurs in repetitive cycles, a circuit according to claim 9 wherein said first pulse producing means comprises means for producing a pulse having a duration proportional to the magnitude of said first signal, said first constant current generating means comprising means making the duration of said constant current signal the same as said produced first pulse, and said second pulse producing means comprises means for producing a pulse having a duration proportional to the magnitude of the difference between said sampled sum signal and twice said associated storage device sampled signal, and said constant current generating and applying means comprises means for making the duration of the second constant current signal the same as said produced second pulse.

11. In a time division communication system having first and second groups of communication path storage devices wherein a plurality of time slots occurs in repetitive cycles, a circuit according to claim 10 wherein each of said communication path storage devices comprises a storage capacitor and said bridging storage device comprises a bridging storage capacitor.

12. In a time division communication system having first and second groups of communication path storage devices wherein a plurality of time slots occurs in repetitive cycles, a circuit according to claim 11 wherein said stored sum signal removing means comprises normally open switching means connected to said bridging capacitor, said normally open switching means being operative in the the last time slot of said second plurality of time slots for discharging the sum signal in said bridging storage capacitor.

* * * * *